(12) United States Patent  (10) Patent No.: US 8,971,042 B2
Liu  (45) Date of Patent: Mar. 3, 2015

(54) COMPUTER SYSTEM

(71) Applicant: Wistron Corp., New Taipei (TW)

(72) Inventor: Sheng-Fu Liu, New Taipei (TW)

(73) Assignee: Wistron Corp., New Taipei (TW)

( * ) Notice: Subject to any disclaimer, the term of this patent is extended or adjusted under 35 U.S.C. 154(b) by 78 days.

(21) Appl. No.: 13/671,504

(22) Filed: Nov. 7, 2012

(65) Prior Publication Data

US 2013/0258584 A1 Oct. 3, 2013

(30) Foreign Application Priority Data

Mar. 28, 2012 (TW) .............................. 101110731 A

(51) Int. Cl.
*H05K 7/20* (2006.01)
(52) U.S. Cl.
USPC ....... 361/703; 361/694; 361/679.49; 361/714
(58) Field of Classification Search
CPC ............ G06F 1/206; G06F 1/20; G06F 1/203
USPC .......................... 361/679.46–679.54, 688–723
See application file for complete search history.

(56) References Cited

U.S. PATENT DOCUMENTS

| | | | | |
|---|---|---|---|---|
| 4,780,062 | A * | 10/1988 | Yamada et al. ............. | 417/410.2 |
| 4,923,000 | A * | 5/1990 | Nelson ........................... | 165/122 |
| 5,704,212 | A * | 1/1998 | Erler et al. ........................ | 62/3.2 |
| 6,588,497 | B1 * | 7/2003 | Glezer et al. .................... | 165/84 |
| 6,853,553 | B2 * | 2/2005 | Seaton et al. ................. | 361/695 |
| 6,979,050 | B2 * | 12/2005 | Browne et al. ............. | 296/180.5 |
| 8,322,889 | B2 * | 12/2012 | Petroski ......................... | 362/294 |
| 2004/0244405 | A1 * | 12/2004 | Kim et al. ........................ | 62/498 |
| 2008/0062644 | A1 * | 3/2008 | Petroski ......................... | 361/695 |
| 2008/0101014 | A1 * | 5/2008 | Damien ......................... | 361/689 |
| 2008/0218972 | A1 * | 9/2008 | Sauciuc et al. ................ | 361/704 |
| 2010/0155047 | A1 * | 6/2010 | Lin et al. ........................ | 165/288 |
| 2011/0064594 | A1 * | 3/2011 | Wada et al. ................. | 417/410.2 |
| 2011/0235272 | A1 * | 9/2011 | Bash et al. ..................... | 361/692 |
| 2013/0083481 | A1 * | 4/2013 | Goto et al. .................... | 361/695 |
| 2013/0301218 | A1 * | 11/2013 | Li et al. ......................... | 361/695 |

FOREIGN PATENT DOCUMENTS

TW 201118544 A 6/2011

OTHER PUBLICATIONS

Taiwan Patent Office, Office Action, Patent Application Serial No. 101110731, Jul. 25, 2014, Taiwan.

* cited by examiner

*Primary Examiner* — David M Sinclair
*Assistant Examiner* — Robert Brown

(57) ABSTRACT

A computer system is provided. The computer system includes a housing, a mainboard, a first heat source, a second heat source and a flow field modulator. An inlet and an outlet are formed on the housing. The mainboard is disposed in the housing. The first heat source is located on a first location of the mainboard. The second heat source is located on a second location of the mainboard. The flow field modulator is disposed on the mainboard including a control unit, a piezoelectric element and a guiding sheet. The control unit is electrically connected to the mainboard. The piezoelectric element is electrically connected to the control unit. The guiding sheet is connected to the piezoelectric element.

8 Claims, 5 Drawing Sheets

US 8,971,042 B2

COMPUTER SYSTEM

CROSS REFERENCE TO RELATED APPLICATIONS

This Application claims priority of Taiwan Patent Application No. 101110731, filed on Mar. 28, 2012, the entirety of which is incorporated by reference herein.

BACKGROUND OF THE INVENTION

1. Field of the Invention

The present invention relates to a computer system, and in particular relates to a computer system with an inner flow field modulating function.

2. Description of the Related Art

Computer systems comprise various chip modules for performing different operation functions. The chip modules provide different functions, and have different temperature variations when the computer system is operating. Conventionally, for dissipating the heat from the high-heat-generating chip modules, an air guiding lid is disposed at an inlet of the computer system to guide the air flow toward the high-heat-generating chip modules and to decrease the temperature thereof. However, with increased calculation requirements and the more complex layout of the computer system nowadays, the chip modules at different locations of the computer system may, respectively overheat at different time points, and the conventional air guiding lid may not satisfactorily dissipate heat according to requirements.

BRIEF SUMMARY OF THE INVENTION

A computer system is provided. The computer system includes a housing, a mainboard, a first heat source, a second heat source and a flow field modulator. An inlet and an outlet are formed on the housing. The mainboard is disposed in the housing. The first heat source is located on a first location of the mainboard. The second heat source is located on a second location of the mainboard. The flow field modulator is disposed on the mainboard including a control unit, a piezoelectric element and a guiding sheet. The control unit is electrically connected to the mainboard. The piezoelectric element is electrically connected to the control unit. The guiding sheet is connected to the piezoelectric element.

Utilizing the computer system of the embodiment of the invention, the flow field is dynamically controlled according to the temperature sensing signal and the voltage supply signal to remove the heat therein. Therefore, the heat dissipation efficiency of the computer system is improved, and the chip layout inside the computer system is more flexible.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
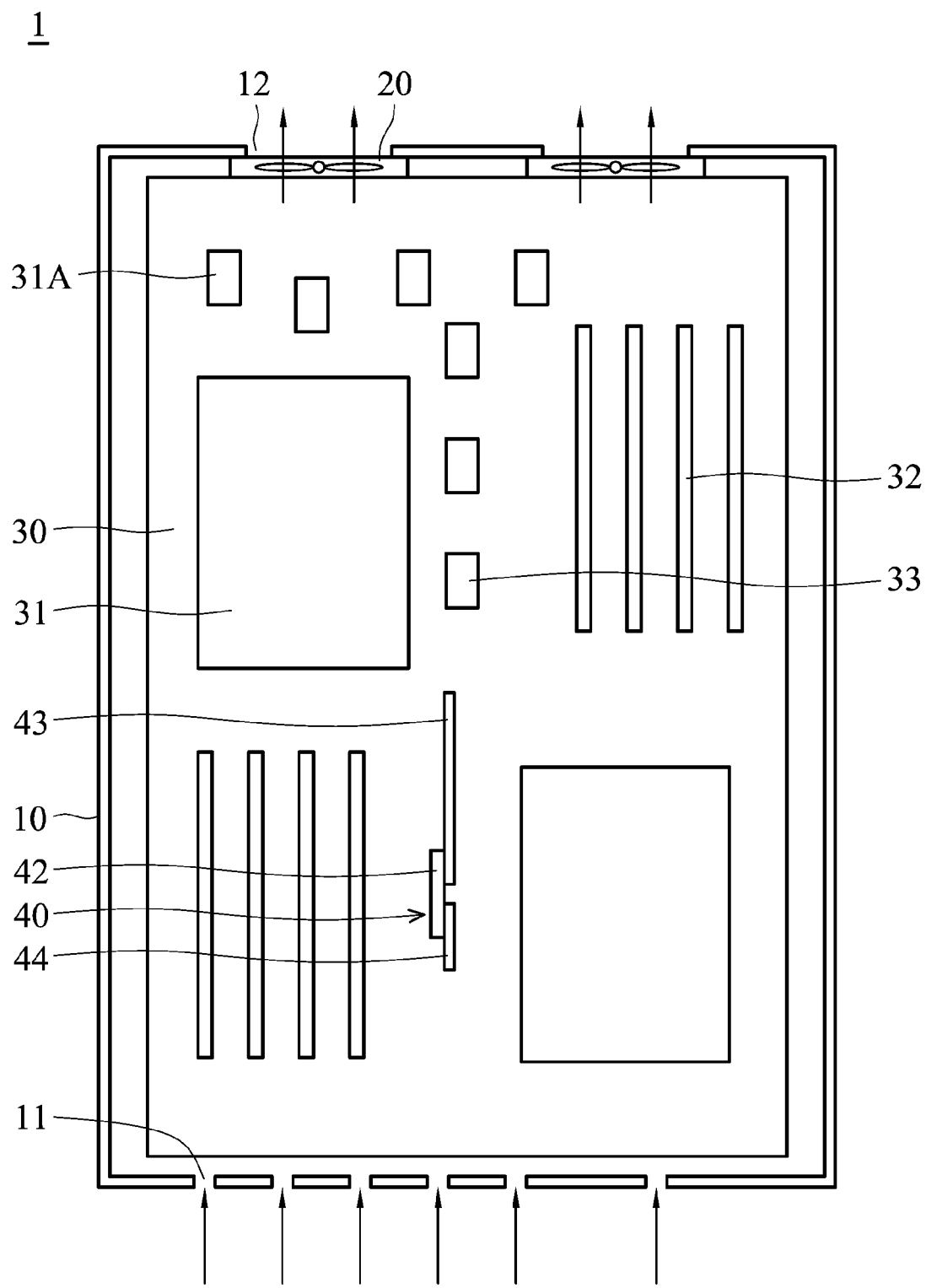
FIG. 1 shows the computer system of an embodiment of the invention.

FIG. 1 shows a computer system 1 of an embodiment of the invention, comprising a housing 10, fans 20, a mainboard 30, a first heat source (first chip) 31, a second heat source (second chip) 32 and a flow field modulator 40. Inlets 11 and outlets 12 are formed on the housing 10. The fans 20 are disposed on the housing and corresponding to the outlets 12. The mainboard 30 is disposed in the housing 10. The first heat source 31 is located on a first location of the mainboard 30. The second heat source 32 is located on a second location of the mainboard 30. The flow field modulator 40 is disposed on the mainboard 30, and is located in the flow path of the air flow.

In a modified example, the fans 20 are not disposed on the housing 10, but are disposed on other portions of the computer system 1. The positions of the fan 20 disclosed in the embodiments of the invention do not restrict the invention.

Figure 3:
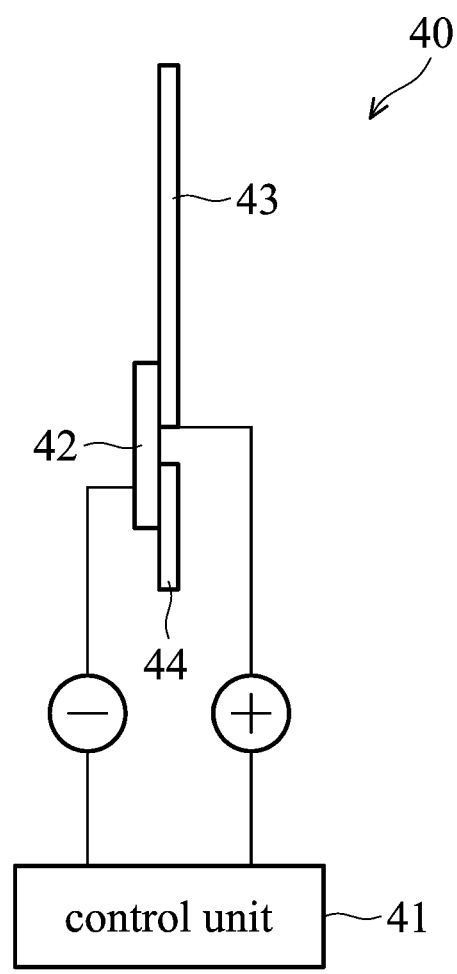
FIG. 3 shows the flow field modulator of the embodiment of the invention.

FIG. 3 shows the flow field modulator 40 of the embodiment of the invention, which includes a control unit 41, a piezoelectric element 42, a guiding sheet 43 and a base 44. The control unit 41 is electrically connected to the mainboard 30. The piezoelectric element 42 is electrically connected to the control unit 41. The guiding sheet 43 is connected to the piezoelectric element 42. The base 44 is structurally disposed on the mainboard 30 (with reference to FIG. 1). The piezoelectric element 42 is disposed on the base 44. The base 44 is made of insulation material, for example, bakelite. The control unit 41 is structurally disposed on the mainboard 30.

Figure 2A:
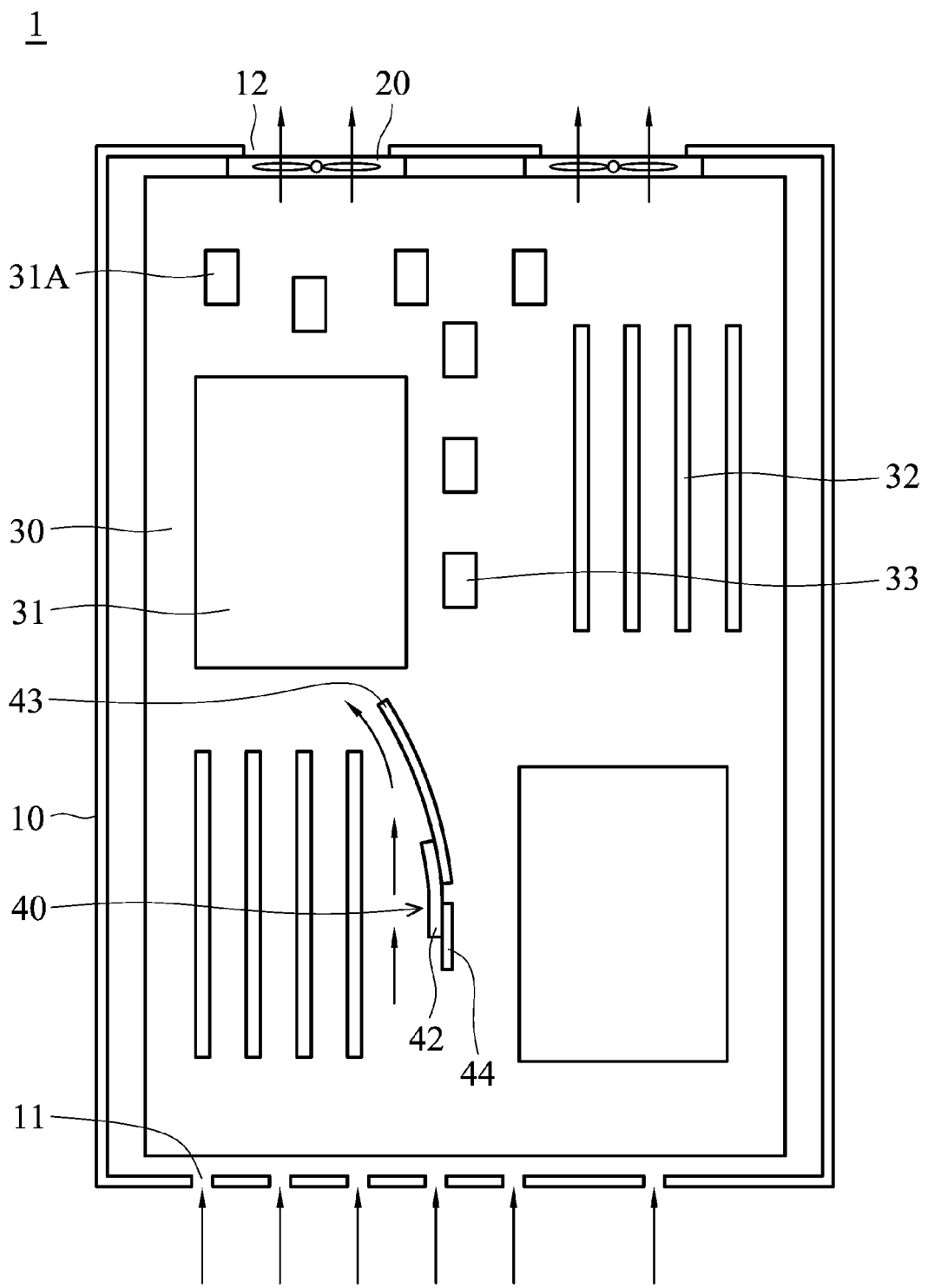
FIG. 2A shows the air flow being guided by the guiding sheet toward the first heat source.
Figure 2B:
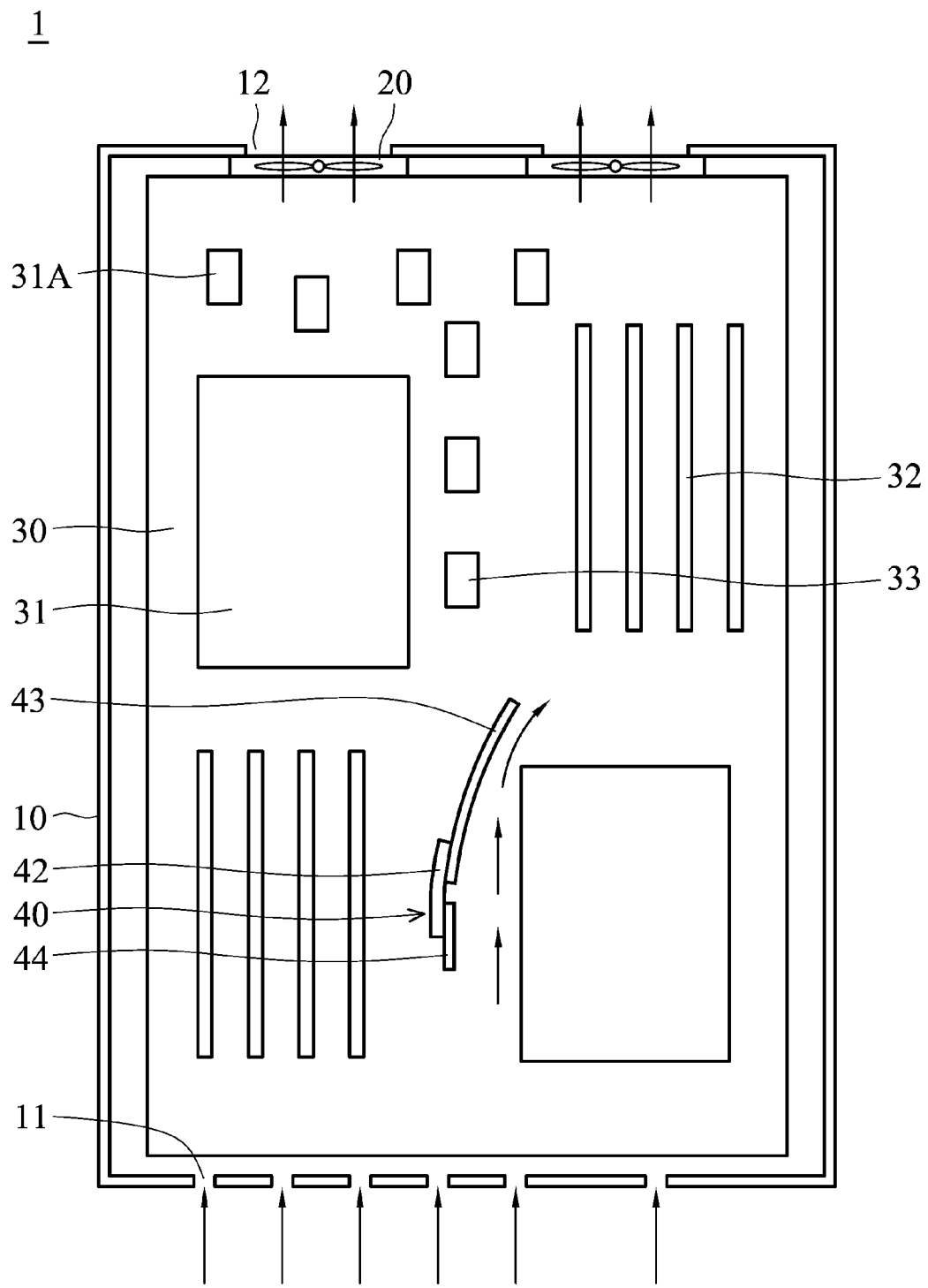
FIG. 2B shows the air flow being guided by the guiding sheet toward the second heat source.

With reference to FIGS. 2A and 2B, when the computer system 1 is operated, the fans 20 impel an air flow. The air flow enters the housing 10 through the inlets 11, guided by the guiding sheet 43 toward the first heat source 31 (FIG. 2A) or the second heat source 32 (FIG. 2B), and leaves the housing 10 through the outlets 12.

In this embodiment, the mainboard 30 provides a temperature sensing signal. The control unit 41 controls the piezoelectric element 42 to turn the guiding sheet 43 toward the first heat source 31 or the second heat source 32 according to the temperature sensing signal, and to guide the air flow toward the first heat source 31 or the second heat source 32. For example, when the temperature of the first heat source 31 reaches a first threshold limit value, the guiding sheet 43 is turned toward the first heat source 31 to guide the air flow toward the first heat source 31. As well, when the temperature of the second heat source 32 reaches a second threshold limit value, the guiding sheet 43 is turned toward the second heat source 32 to guide the air flow toward the second heat source 32.

In a modified example of the invention, the mainboard 30 further provides a voltage supply signal. The control unit 41 controls the piezoelectric element 42 to turn the guiding sheet 43 toward the first heat source 31 or the second heat source 32 according to the temperature sensing signal and the voltage supply signal, and to guide the air flow toward the first heat source 31 or the second heat source 32. In the computer system 1, the mainboard 30 may not detect the temperature of all electronic elements thereon. Therefore, for example, when the first heat source 31 is supplied with a larger voltage, the temperature of the electronic elements 31A around the first heat source 31 may be raised. However, in this situation, the temperature of the first heat source 31 may not reach the first threshold limit value, and thus, overheated electronic elements 31A would not be detected, and the heat on the electronic elements 31A would not be dissipated immediately. According to the embodiment of the invention, the guiding sheet 43 is turned by the piezoelectric element 42 toward the first heat source 31 or the second heat source 32 according to the voltage supply signal, to guide the air flow toward the first heat source 31 or the second heat source 32. The heat on the electronic elements around the first heat source 31 or the second heat source 32 can be dissipated immediately, and the problem mentioned above is overcome.

A control process of the flow field modulator of the embodiment of the invention is provided. First, the control unit determines whether the temperature of the first heat source has reached the first threshold limit value, or the temperature of the second heat source has reached the second threshold limit value according to the temperature sensing signal. If the temperature of the first heat source has reached the first threshold limit value, or, the temperature of the second heat source has reached the second threshold limit value, the piezoelectric element is controlled according to the temperature sensing signal to guide the air flow toward the first heat source or the second heat source, respectively. If the temperature of the first heat source does not reach the first threshold limit value and the temperature of the second heat source does not reach the second threshold limit value, the piezoelectric element is controlled according to the voltage supply signal to guide the air flow toward the first heat source or the second heat source. Meanwhile, the control unit keep watching the temperature sensing signal. If the temperature of the first heat source has reached the first threshold limit value, or, the temperature of the second heat source has reached the second threshold limit value, the piezoelectric element is controlled according to the temperature sensing signal preferentially to guide the air flow toward the first heat source or the second heat source, respectively.

With reference to FIG. 1, in the embodiment of the invention, the computer system 1 further comprises a third heat source 33. The third heat source 33 is located between the first heat source 31 and the second heat source 32. When the guiding sheet 43 is not turned by the piezoelectric element 42, the air flow travels toward the third heat source 33. In this embodiment, the control unit 41 controls the piezoelectric element 42 to guide the air flow toward the first heat source 31, the second heat source 32 or the third heat source 33 according to the temperature sensing signal and the voltage supply signal. In the embodiments of the invention, the computer system has two or three heat sources. However, the invention is not limited thereto. The computer system utilizing the invention can have more than three heat sources which have heat dissipation requirements.

Figure 4:
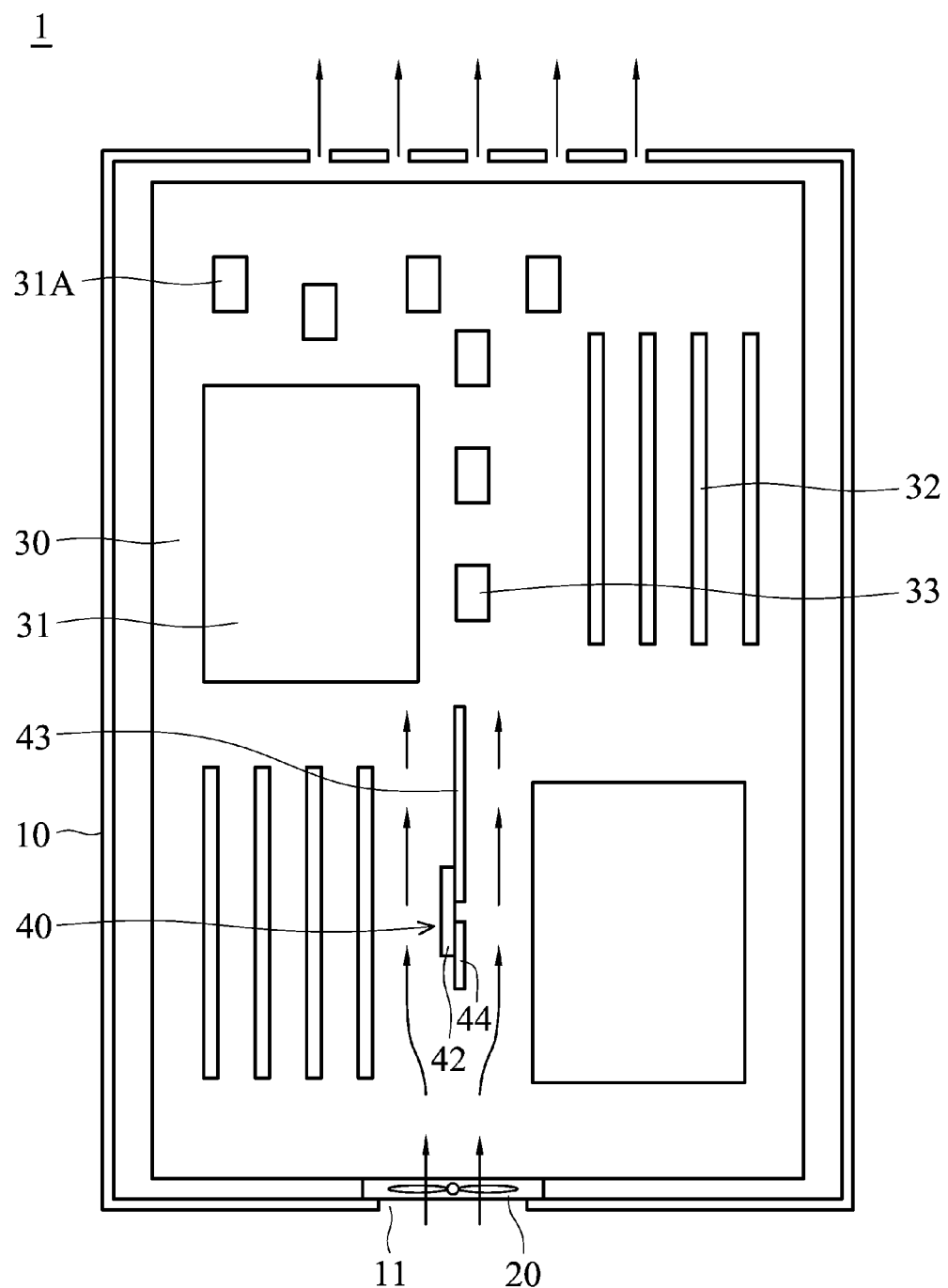
FIG. 4 shows the computer system of another embodiment of the invention.

FIG. 4 shows another embodiment of the invention, wherein the fan 20 is corresponding to the inlet 11, and impels the air flow toward the flow field modulator 40. As mentioned above, in this embodiment, the control unit controls the piezoelectric element to turn the guiding sheet toward the first heat source 31, the second heat source 32 or the third heat source 33 according to the temperature sensing signal and the voltage supply signal.

Utilizing the computer system of the embodiment of the invention, the flow field is dynamically controlled according to the temperature sensing signal and the voltage supply signal to dissipate heat. Therefore, the heat dissipation efficiency of the computer system is improved, and the chip layout inside the computer system is more flexible.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system, comprising:
a housing, wherein an inlet and an outlet are formed on the housing;
a mainboard, disposed in the housing;
a first heat source, located on a first location of the mainboard;
a second heat source, located on a second location of the mainboard;
a fan disposed on the housing; and
a flow field modulator, disposed on the mainboard, comprising:
a control unit, electrically connected to the mainboard;
a piezoelectric element, electrically connected to the control unit;
a guiding sheet, connected to the piezoelectric element, wherein the control unit is configured to control the piezoelectric element to selective turn the guiding sheet toward the first heat source or the second heat source such that an air flow impelled by the fan is selectively guided by the guiding sheet toward the first heat source or the second heat source;
wherein the mainboard provides a voltage supply signal indicating a respective voltage supply of the first heat source and the second heat source, and a temperature sensing signal indicating a respective temperature of the first heat source and the second heat source;
wherein the control unit is configured to control the piezoelectric element to turn the quidinq sheet toward the first heat source or the second heat source according to the voltage supply signal when the temperature sensing signal indicates that the temperature of both the first heat source and the second heat source is below a respective first threshold limit value and second threshold limit value; and
wherein the control unit is configured to control the piezoelectric element to turn the quidinq sheet toward the first heat source or the second heat source according to the temperature sensing signal when the temperature sensing signal indicates that the temperature of the first heat source or the second heat source is above the respective first threshold limit value or second threshold limit value.

2. The computer system as claimed in claim 1, wherein the flow field modulator comprises a base, the base is disposed on the mainboard, the piezoelectric element is disposed on the base, and the base is made of insulation material.

3. The computer system as claimed in claim 1, further comprising a third heat source, located on a third location of the mainboard between the first heat source and the second heat source.

4. The computer system as claimed in claim 1, wherein the fan is facing to the inlet.

5. The computer system as claimed in claim 4, wherein the flow field modulator is facing to the inlet.

6. The computer system as claimed in claim 1, wherein the first heat source and the second heat sources are chips.

7. The computer system as claimed in claim 1, wherein the control unit is configured to control the piezoelectric element to turn the guiding sheet toward the first heat source or the second heat source according to which has a higher voltage supply when the temperature sensing signal indicates that the temperature of both the first heat source and the second heat source is below a respective first threshold limit value and second threshold limit value.

8. The computer system as claimed in claim 1, wherein the control unit is configured to control the piezoelectric element to turn the guiding sheet toward the first heat source or the second heat source according to which has a higher temperature when the temperature sensing signal indicates that the temperature of the first heat source or the second heat source is above the respective first threshold limit value or second threshold limit value.

* * * * *